No. 725,359. PATENTED APR. 14, 1903.
J. P. PFEIFFER & B. F. MORRIS.
HARROW.
APPLICATION FILED APR. 7, 1902.
NO MODEL.
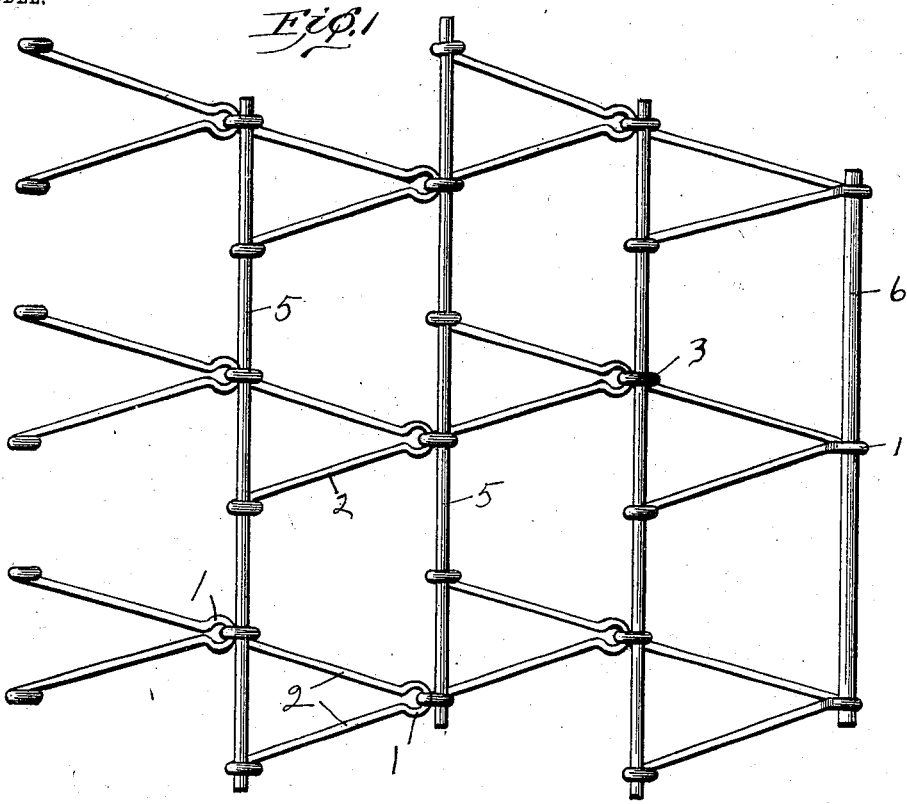
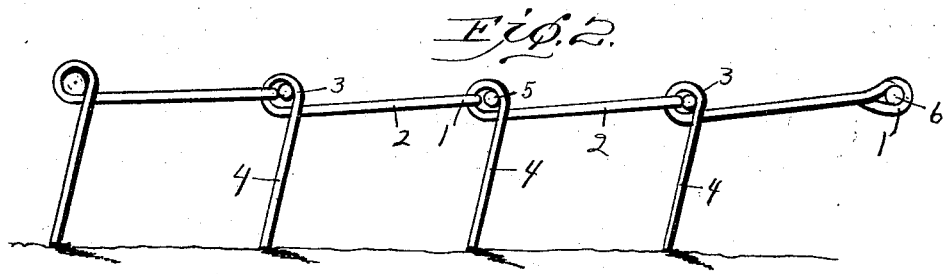
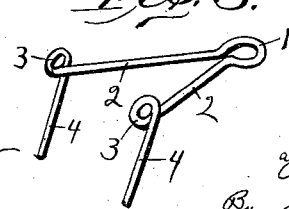

UNITED STATES PATENT OFFICE.

JOHN PAUL PFEIFFER AND BENJAMIN FRANKLIN MORRIS, OF MARSH, IOWA.

HARROW.

SPECIFICATION forming part of Letters Patent No. 725,359, dated April 14, 1903.

Application filed April 7, 1902. Serial No. 101,752. (No model.)

*To all whom it may concern:*

Be it known that we, JOHN PAUL PFEIFFER and BENJAMIN FRANKLIN MORRIS, citizens of the United States, residing at Marsh, in the county of Louisa and State of Iowa, have invented certain new and useful Improvements in Harrows; and we do hereby declare the following to be a full, clear, and exact description of the invention, such as will enable others skilled in the art to which it appertains to make and use the same.

Our invention relates to certain new and useful improvements in harrows, and has for its object to produce a harrow which will be simple in its construction and cheap to manufacture, while being efficient in its operation and durable in wear. We accomplish these objects by constructing the harrow of a number of members linked together and threaded on cross-rods, each member being formed of a piece of spring-wire bent at its middle to form a connecting-eye, with diverging arms terminating in spiral loops with depending spurs. The members are adapted to be linked together by having the eye of one member passed through one of the loops of the preceding member, and thus form a line or row of members, which lines or rows are connected together by rods passing through the loops of the members.

With the above and other objects in view our invention further consists in the novel details of construction and combination of parts to be clearly described in the following specification and fully set forth in the claim.

Referring to the accompanying drawings, forming a part of this specification, and in which like characters of reference indicate same parts throughout the several views, Figure 1 is a plan view of a harrow complete constructed in accordance with our invention. Fig. 2 is a side elevation thereof, and Fig. 3 is a perspective view of one member.

In the drawings the members are shown as being formed of a piece of spring-wire bent at about its middle portion to form an eye 1, with diverging arms 2 terminating in upwardly-bent coils or loops 3, which take a spiral form of one or more convolutions, but preferably one, as shown, and have downward extensions or spurs 4, which slant slightly to the rear and pass the arms 2 on the outer side thereof. These members are linked together by having the eye 1 of one member engaging the loop 3 of the preceding member, thus forming a line of members which are staggered with relation to each other—that is, that a member engaging the right loop of the preceding member has its left loop engaged by the succeeding member, and so on. Several rows of members thus joined are bound together by cross-rods 5, passing through the loops of all the members abreast of each other—that is to say, that the first members of all the rows have their loops threaded on the first cross-rod 5, and so on. The loops 3, which receive an eye 1 as well as a cross-rod 5, are made somewhat larger than the others. The eyes of the first members of the several rows are bent into vertical planes instead of lying in the plane of the arms 2, as with the other members, and these eyes are threaded on a draw-bar 6, to which a team of horses may be attached in any suitable manner.

Having fully described our invention, what we claim as new, and desire to secure by Letters Patent, is—

In a harrow, a number of members formed of spring-wire bent to form an eye at their forward parts with diverging arms extending therefrom and terminating in upwardly-bent coils having downwardly-extending spurs, the several members being connected together in several rows by each having its eye engaged in one of the coils of the preceding member, the successive members of each row being connected alternately to the right-hand coil and the left-hand coil of the members preceding, and cross-rods passing through the coils of the members of the several rows which are abreast of each other.

In testimony whereof we affix our signatures in presence of two witnesses.

JOHN PAUL PFEIFFER.
BENJAMIN FRANKLIN MORRIS.

Witnesses:
T. G. HARPER,
AUSTIN BONER.